United States Patent [19]

Henis et al.

[11] 4,011,299

[45] Mar. 8, 1977

[54] PROCESS FOR REMOVING SULFUR DIOXIDE AND NITROGEN OXIDES FROM GASES

[75] Inventors: Jay M. Henis; Mary K. Tripodi, both of Creve Coeur, Mo.

[73] Assignee: Monsanto Company, St. Louis, Mo.

[22] Filed: Oct. 1, 1975

[21] Appl. No.: 618,729

[52] U.S. Cl. .............................. 423/239; 423/244; 423/561 A

[51] Int. Cl.² .......................................... B01D 53/00

[58] Field of Search .......... 423/239, 244, 561, 570

[56] References Cited

UNITED STATES PATENTS

| | | | |
|---|---|---|---|
| 2,090,828 | 8/1937 | Beckman | 423/244 |
| 3,454,355 | 7/1969 | Ryason | 423/239 |
| 3,459,494 | 8/1969 | Harris et al. | 423/239 |
| 3,699,037 | 10/1972 | Anesser et al. | 423/244 X |
| 3,717,700 | 2/1973 | Robison et al. | 423/244 |

*Primary Examiner*—G. O. Peters
*Attorney, Agent, or Firm*—Joseph D. Kennedy; John D. Upham

[57] ABSTRACT

Process for removing sulfur dioxide and nitrogen oxides from gaseous mixtures which comprises contacting such mixtures, in the presence of a reducing agent comprising carbon monoxide, hydrogen, or mixtures thereof, with a solid reagent comprising calcium oxide, magnesium oxide, or mixtures thereof at temperatures in excess of about 700° C.

11 Claims, 2 Drawing Figures

PROCESS FOR REMOVING SULFUR DIOXIDE AND NITROGEN OXIDES FROM GASES

BACKGROUND OF THE INVENTION

The present invention concerns a process for removing sulfur dioxide and nitrogen oxides from stack gases containing the same which comprises contacting such gases at temperatures in excess of about 700° C and sufficient to remove in general greater than 80 percent of the sulfur dioxide and nitrogen oxides present with a solid reagent comprising calcium oxide, magnesium oxide, or mixtures thereof in the presence of a reducing agent which comprises carbon monoxide, hydrogen, or mixtures thereof.

The term "nitrogen oxides" as employed herein encompasses any one or more of five different nitrogen oxides—nitric oxide (NO), nitrogen dioxide ($NO_2$), dinitrogen oxide ($N_2O$), dinitrogen trioxide ($N_2O_3$), and dinitrogen pentoxide ($N_2O_5$)—although of this group only nitric oxide and nitrogen dioxide are known to play a significant role in air quality problems, and it is these two nitrogen oxides with which the present process is particularly concerned. The nitrogen oxides as found in stack gases and other combustion products are represented in the current literature by the general formula "$NO_{(x)}$."

The process of the present invention is characterized by maintaining, in the presence of the reducing agent, an excess of the solid reagent sufficient to facilitate the efficient reaction of sulfur dioxide under the reaction conditions. The maintenance of the excess of solid reagent makes possible under the reaction conditions employed the utilization of a high space velocity for the stack gases.

The process is further characterized by effective and efficient removal of sulfur dioxide and nitrogen oxides—in general greater than 80 percent removal—at the high space velocities herein employed.

The term "space velocity" as employed herein means the reciprocal of the contact time of the stack gases with the solid reagent.

The present process, in addition to providing for effective and efficient removal of sulfur dioxide and nitrogen oxides from stack gases containing the same by conversion, respectively, into calcium or magnesium sulfide and nitrogen gas, also provides for regeneration of the original solid reagent from the corresponding sulfide product. This regenerative procedure facilitates both the further use of the solid reagent in the process and simultaneously, the recovery of valuable sulfur values as either pure hydrogen sulfide, pure elemental sulfur, or high grade sulfuric acid.

Sulfur dioxide and nitrogen oxides are noxious components of stack gases. And even though they are generally present in relatively low concentrations, large amounts of both sulfur dioxide and nitrogen oxides are produced each year as waste products. It has been estimated that $36.6 \times 10^6$ tons of sulfur dioxide were emitted from stationary sources in 1971 and that sulfur dioxide emissions could quadruple by the year 2000 if adequate controls are not provided. Approximately one-half of this sulfur dioxide emission level is due to power plants burning coal and oil.

Thus millions of tons of sulfur are wasted each year by the discharge into the atmosphere of stack gases containing sulfur dioxide. And, not only is the discharge of sulfur dioxide into the atmosphere a waste of a valuable chemical, sulfur dioxide also has a damaging effect on human beings, animals, agricultural areas and in general is one of the major causes of air pollution.

Nitrogen oxides also occur in stack gases. These oxides are significant contributors to smog formation. In 1968 nitrogen oxides emissions were estimated to be about $16 \times 10^6$ tons, about 60 percent of which originated from stationary sources.

The fact that the concentrations of both sulfur dioxide and nitrogen oxides in stack gases are low, for example, less than 0.3 percent by volume, and the fact that the concentrations are to be reduced to significantly lower values, for example, less than 0.025 percent, presents a formidable removal problem.

Several processes have been suggested for reducing sulfur dioxide and nitrogen oxides emissions from stacks of combustion operations. One such suggestion is to use fuels low in sulfur content but such fuels are generally regarded as too expensive for widespread use. Other suggestions have included reduction of sulfur or nitrogen content of fuels, modification of the combustion process, and various wet and dry processes for removing sulfur dioxide and nitrogen oxides from the stack gases. Kinetic processes for removing sulfur dioxide and nitrogen oxides by reduction in the presence of reducing gases and suitable catalysts to elemental sulfur and nitrogen gas have also been considered. Each of these processes, however, has a variety of well publicized disadvantages, including cost, by-product sales, associated water or solid waste problems, and a general lack of efficiency. In addition, during each of the suggested processes for noxious gas abatement significant cooling of the gases must be avoided. Otherwise, the cooled gases lose their buoyancy and descend in the neighborhood of the stack. This results in a greater local awareness of the presence of sulfur dioxide and nitrogen oxides than before the attempted removal was initiated unless essentially complete removal of the noxious gases is effected.

It is therefore an object of the present invention to provide an effective and efficient process for removing sulfur dioxide and nitrogen oxides from stack gases.

Various other objects and advantages of this invention will become apparent from the accompanying description and disclosure.

The above and other objects have been accomplished in a very effective and efficient manner by the process of the present invention. The unexpected success with which the objects have been accomplished is apparent from the unique properties and advantages of the present process as described in the following specification. Briefly, however, these include:

a. Simultaneous removal of sulfur dioxide and nitrogen oxides from stack gases containing the same;
b. The enhancement of the removal of nitrogen oxides by the initially added solid reagent as well as the corresponding sulfide produced therefrom in the presence of sulfur dioxide without any increase in production of undesirable side products such as hydrogen sulfide and carbon oxysulfide;
c. The absence of any further reduction of the corresponding sulfide produced from the solid reagent to undesirable side products under the reaction conditions employed in the process;
d. The necessity of only providing an excess of reducing agent without any requirement to provide a stoichiometric amount;

e. The efficiency and effectiveness of the present process at high space velocities and low concentrations;

f. Easy regeneration of the solid reagent for further use in the present process.

g. Production of high grade sulfur by-products; and h. Flexibility of choice in by-product.

Figure 2:
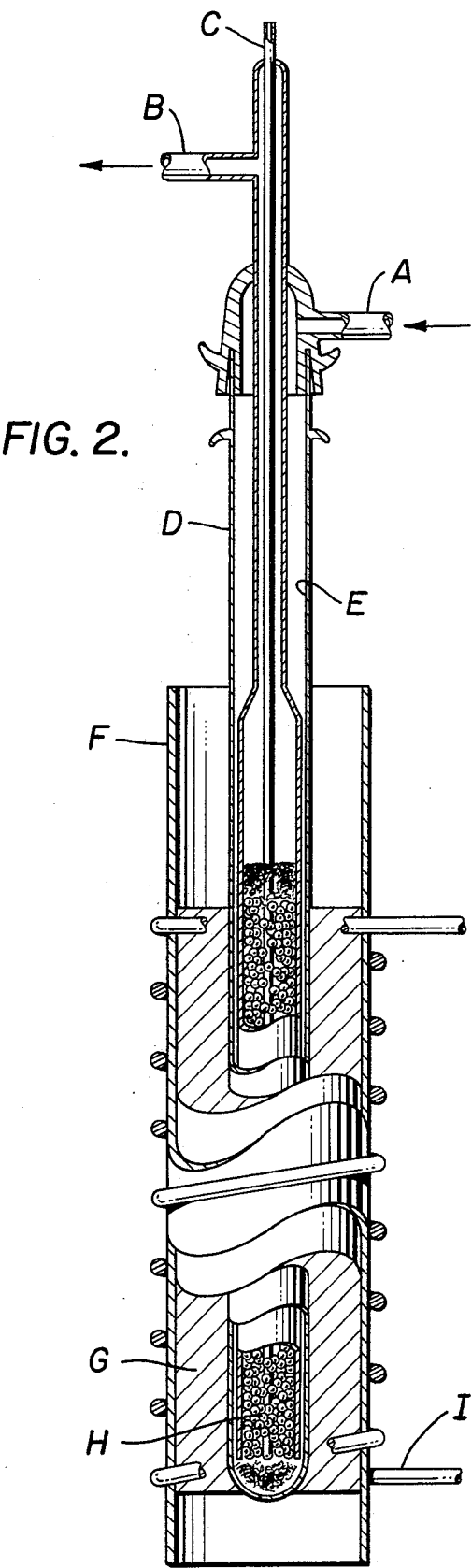

A more detailed schematic drawing of the illustrative reactor is shown by FIG. 2.

DETAILED DESCRIPTION OF THE DRAWINGS

Figure 1:
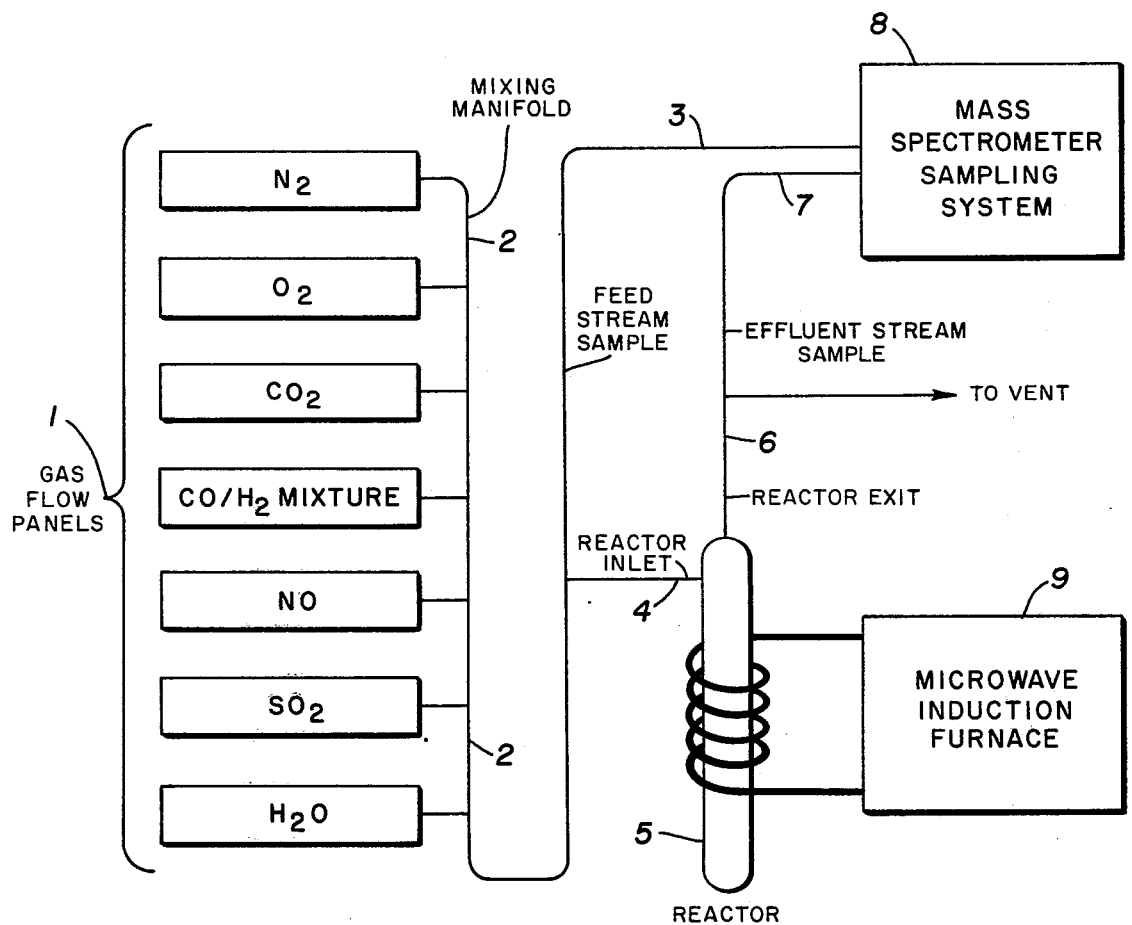
FIG. 1 is a schematic diagram of the reactor system utilized for illustration of the process of the present invention.

The reactor system utilized for illustration of the process of the present invention is shown schematically in FIG. 1. Briefly it consists of seven calibrated gas flow panels 1 which permit a gas blend of nitrogen, carbon dioxide, water, sulfur dioxide, nitrogen oxides, oxygen, and a carbon monoxide and hydrogen mixture to be made up (with an accuracy of about plus or minus 5 percent of each gas flow rate) and passed by way of mixing manifold 2 either directly to mass spectrometer sampling system 8 by way of feed stream sample line 3 which by-passes reactor 5 or through reactor inlet 4 into reactor 5 which is heated by microwave induction furnace 9.

Reactor 5, which is shown in greater detail in FIG. 2, consists of 6.25 millimeter (¼ inch) outside diameter gas inlet A, 6.25 millimeter (¼ inch) outside diameter gas exit B, 3.12-millimeter (½ inch) thermocouple well C to accommodate 1.56-millimeter (1/16) inch K-type chromel-alumel thermocouple for measuring the temperature of the system.

The outer shell (D) of reactor 5 is a 33 millimeter (1-3/10 inches) outside diameter and 508 millimeters (20 inches) in length tube having a male standard taper joint for mating with the female standard taper joint cap of inner shell E. Inner shell E of reactor 5 is 355.6 millimeters (14 inches) in length to the narrowing point and 25 millimeters (123/125 inch) outside diameter.

Reactor 5 is packed with a solid reagent comprising calcium oxide, magnesium oxide, or mixtures thereof and inserted into 53.5 millimeter (2½ inches) outside diameter graphite rod G, bored out to 33 millimeters (1-3/10 inches). Graphite rod G is inserted into protective tube F, which also serves to support microwave induction heating coil I. Heating coil I is capable of heating reactor 5 to temperatures ranging from about 30° C to about 1000° C.

SUMMARY OF THE INVENTION

According to the process of the present invention, sulfur dioxide and nitrogen oxides can be effectively and efficiently removed from stack gases containing the same by contacting such gases at temperatures in excess of about 700° C and sufficient to remove in general greater than 80 percent of the sulfur dioxide and nitrogen oxides present with a solid reagent comprising calcium oxide, magnesium oxide, or mixtures thereof in the presence of a reducing agent. The reducing agent may be carbon monoxide, hydrogen, or mixtures thereof. The preferred reducing agent is a mixture comprising between about 65 percent and about 85 percent carbon monoxide and between about 15 percent and about 35 percent hydrogen.

In accordance with the present process, sulfur dioxide and nitrogen oxides are converted, respectively, into the corresponding sulfides of the alkaline earth metal ion of the solid reagent utilized and nitrogen gas. The latter product is released into the atmosphere as a harmless gas while the former product is recovered and converted via treatment with steam at temperatures of at least about 650° C and pressures of at least about 2 atmospheres initially into pure hydrogen sulfide. The hydrogen sulfide can either be used as such or converted via a series of reactions well known in the art into pure elemental sulfur or high grade sulfuric acid.

Thus the direct conversion of sulfur dioxide into calcium or magnesium sulfide not only provides an efficient and effective process for removing sulfur dioxide from stack gases—in general greater than 80 percent removal—it also prevents the loss of valuable sulfur values.

DETAILED DESCRIPTION OF THE INVENTION

Sulfur dioxide and nitrogen oxides are efficiently and effectively removed from stack gases by contacting such gases containing the same, in the presence of a suitable reducing agent, preferably a mixture comprising between about 65 percent and about 85 percent carbon monoxide and between about 15 percent and about 35 percent hydrogen, with a solid reagent comprising calcium oxide, magnesium oxide, or mixtures thereof at temperatures in excess of about 700° C and sufficient to remove in general greater than 80 percent of the sulfur dioxide and nitrogen oxides present. The process is characterized by maintaining an excess of the solid reagent sufficient to facilitate the reaction of sulfur dioxide under the reaction conditions. The maintenance of the excess of solid reagent makes possible under the reaction conditions employed the utilization of a high space velocity for the stack gases. The efficiency of the reaction is essentially maintained until between about 75 percent to about 85 percent of the initially added solid reagent is converted to the corresponding sulfide. Thereafter the removal efficiency of sulfur dioxide from the gas stream is reduced significantly, although that of the nitrogen oxides remains essentially constant since the nitrogen oxides decomposition reaction is enhanced by both the initial solid reagent and the corresponding sulfide produced therefrom. The initial efficiency of the sulfur dioxide removal reaction is restored, however, by either replacing the spent solid reagent with a fresh charge and repeating the process or by continually adding fresh solid reagent and removing the product so as to keep the total sulfide concentration below about 75 percent to about 85 percent of the total solid charge. It is recognized, however, that the foregoing parameters will vary with changes in the space velocity of the gas stream as well as changes in the reactor volume and other design features of the illustrative apparatus.

While the presence of calcium oxide, magnesium oxide, or mixtures thereof as the solid reagent is required during the actual reactions of the present process, it is to be understood that the direct addition of said solid reagent to the reaction is not required. The addition of any compound, such as, for example, calcium carbonate, magnesium carbonate, or calcium magnesium carbonate (dolomite) which can be converted into the corresponding solid reagent under the reaction conditions employed is sufficient. Thus the present invention contemplates the reactions of the present process occurring in the presence of calcium oxide, magnesium oxide, or mixtures thereof, regardless of their source.

Moreover, the present process is not restricted to the employment of ultra pure solid reagent; other components may be present as long as they do not affect the efficiency and effectiveness of the removal of sulfur dioxide and nitrogen oxides from stack gases containing the same. However, the presence of other components which promote the production of undesirable side products, such as, for example, elemental sulfur, hydrogen sulfide, and carbon oxysulfide are to be avoided. It is to be noted that when stack gases are contacted at the conditions of the present process with alumina as the solid reagent extensive conversion of sulfur dioxide to hydrogen sulfide and carbon oxysulfide occurs. For this reason coupled with the fact that the products of the reaction from sulfur dioxide are extremely sensitive to stoichiometry, it is preferred that the reactions of the present process are carried out in the substantial absence of alumina and derivatives thereof.

The process of the present invention is further characterized by effective and efficient removal of sulfur dioxide and nitrogen oxides—in general greater than 80 percent removal— at the space velocities herein employed.

In addition, however, to providing for effective and efficient removal of sulfur dioxide and nitrogen oxides from stack gases containing the same by conversion, respectively, into calcium or magnesium sulfide and nitrogen gas, the present process also provides for regeneration of the original solid reagent by subjecting the corresponding sulfide to treatment with steam at temperatures of at least about 650° C and pressures of at least about 2 atmospheres. This regenerative procedure facilitates the further use of the solid reagent in the process and, simultaneously, the recovery of valuable sulfur values.

The present process requires the presence of a reducing agent. A preferred reducing agent is a gaseous mixture which comprises between about 65 percent and about 85 percent carbon monoxide and between about 15 percent and about 35 percent hydrogen. However, the reducing gas can vary in composition from essentially pure carbon monoxide to essentially pure hydrogen.

The amount of reducing agent is regulated so that at least sufficient reducing agent is present to reduce all of the sulfur dioxide and nitrogen oxides. In addition, a sufficient quantity of reducing agent must be available to reduce the oxygen component of stack gases—ordinarily around 3 percent by volume. It is to be understood, however, that a large excess of reducing agent is not necessary, nor is it excessively harmful. That is, while it is preferred not to employ a large excess of reducing agent since increased conversion of the sulfur dioxide to hydrogen sulfide and carbon oxysulfide results, the quantities produced are generally less than harmful and therefore do not exacerbate the air pollution problem. This is particularly true when calcium oxide, magnesium oxide, or mixtures thereof are employed as the solid reagent since these reactants permit greater latitude in the employment of excess reducing agent than do other solid reactants.

A convenient and preferred stoichiometric ratio of reducing agent to the species being reduced, including oxygen, is between about 2.0 and 3.0 to 1.0. Larger ratios, as noted hereinabove, tend to increase the production of hydrogen sulfide and carbon oxysulfide, both toxic substances in their own right, although the quantities produced, as noted hereinabove, are generally less than harmful.

It is to be noted, however, that any substantial quantities of hydrogen sulfide and carbon oxysulfide produced during the practice of the present process can react with the sulfur dioxide present in the stack gases to produce elemental sulfur. The production of sulfur during the noxious gas removal phase of the present process is generally undesirable due to the difficulties associated with its collection and disposition. More particularly, the sulfur tends to condense within the cooler portions of the apparatus, necessitating the inclusion of means for its removal in order to prevent the ultimate clogging of the apparatus. In addition, such sulfur is of little industrial value, being associated with substantial amounts of soot and fly ash.

The products from the reaction process of the present invention—nitrogen gas from nitrogen oxides and calcium or magnesium sulfide from sulfur dioxide—present none of the disposition problems usually associated with methods and processes for the removal of sulfur dioxide and nitrogen oxides from stack gases. The nitrogen gas is simply released into the atmosphere while the sulfides are recovered and, if desired, converted separately into pure hydrogen sulfide, pure elemental sulfur, or high grade sulfuric acid.

While several complex reaction sequences are involved in the overall reaction process, the net effect can be illustrated by reactions (1) and (2).

(1) 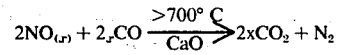

(2) 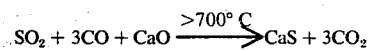

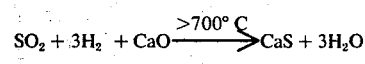

Referring to FIGS. 1 and 2, a typical demonstration of the present process may be described in the following manner. Reactor 5 is packed with either calcium oxide, magnesium oxide, or a mixture thereof as the solid reagent. Quartz wool is used to hold the packing in place. Typical gaseous mixtures containing 77 percent nitrogen, 10 percent carbon dioxide, 3 percent oxygen, 10 percent water, 1500 parts per million (ppm) sulfur dioxide, and 1000 to 1500 parts per million of nitrogen oxides are utilized to approximate real stack gases as nearly as possible. Also included in each gaseous mixture is 5.6 percent reducing agent (based on the total gas flow) comprising 75 percent carbon monoxide and 25 percent hydrogen. This typical gaseous mixture is passed via mixing manifold 2 through reactor inlet 4 into reactor 5 which has been previously heated via microwave heating coils I to a temperature in excess of about 700° C and sufficient to remove in general greater than 80 percent of the sulfur dioxide and nitrogen oxides present. The space velocity of the gas is at least about 15,000 reciprocal hours. After passing over the solid reagent bed the gaseous stream passes through effluent stream line 7 into on line mass spectrometer sampling system 8 for analysis of the gas effluent stream. The following table (TABLE 1) indicates the results for each packing material under typical conditions.

Table 1

| Catalyst | Space Velocity (hr$^{-1}$) | Temp (°C) | % Removal | | Effluent Product Concentrations (ppm) | | | | Distribution of S Species in Final Solids as a Percentage | | | |
|---|---|---|---|---|---|---|---|---|---|---|---|---|
| | | | NO$_{(x)}$ | SO$_2$ | N$_2^c$ | H$_2$S | COS | S° | S$^=$ | SO$_3^=$ | SO$_4^=$ |
| CaO, powder$^a$ | 16,800 | 820° | 91.7 | 91.4 | 510 | 0–30 | 24 | 0 | 84 | 16 | 0 |
| MgO, powder$^b$ | 16,800 | 970° | 81.5 | 92.1 | 470 | 100–150 | 18 | — | $v^d$ | ?$^d$ | — |
| Calcined dolomite$^a$ (58% CaO 39% MgO) | 16,800 | 895° | 94.8 | 94.4 | 530 | 58–140 | 19 | — | $v^d$ | ?$^d$ | — |

$^a$Feed gas composition: 7.2% CO$_2$; 7.2% H$_2$O; 2.1% O$_2$, 5.6% reductant (75% CO – 25% H$_2$ mixture in all cases), 1120 ppm NO$_{(x)}$, and 1120 ppm SO$_2$; balance of gas is N$_2$.
$^b$Feed gas composition as a) except 1160 ppm NO$_{(x)}$.
$^c$Calculated from the amount of No$_{(x)}$ disappearance in effluent.
$^d$vindicates a major constituent and question mark indicates a possible constituent where solids were not analyzed by Electron Spectroscopy Chemical Analysis (ESCA) techniques.

It is evident from the above data that the process of the present invention, as demonstrated in a fixed bed reactor (5), is extremely effective in removing sulfur dioxide and nitrogen oxides from stack gases. Typically, the present process can be used with stack gases containing no more than about 0.05 percent of either or both sulfur dioxide and nitrogen oxides.

The products produced from the present process are nitrogen gas from the nitrogen oxides and calcium or magnesium sulfides from sulfur dioxide. The specific type of sulfide produced is dependent upon the alkaline earth metal ion present in the solid reagent utilized in the reactant bed. For example, when calcium oxide is used as the reactant, calcium sulfide is produced.

Since the atmosphere is composed predominantly of nitrogen which exerts no known harmful effects, the nitrogen gas produced in the present process is safely released into the atmosphere. The alkaline earth metal sulfides, while not so innocuous as nitrogen gas, are also easily disposed off. They can be converted separately into pure hydrogen sulfide (reaction (3)), pure elemental sulfur (reaction sequence (4)), or high grade sulfuric acid (reaction sequence (5)). Simultaneously, the original solid reagent is regenerted, thereby facilitating its further use in the present process.

The initial reaction of the procedure for transforming the calcium or magnesium sulfide into other useful sulfur products is accomplished by treatment with steam at a temperature of at least about 650° C and a pressure of at least about 2 atmospheres. By this procedure the solid reagent is regenerated and becomes available for further use in the present process. The by-product of the initial reacton is hydrogen sulfide. The reaction can be illustrated by reaction (3).

(3) 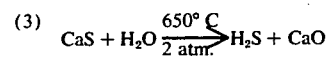

A number of attractive alternatives are available for utilizing the hydrogen sulfide from reaction (3). It may be collected and sold commercially as a high grade product. Alternatively, it may be converted into elemental sulfur (reaction sequence (4)) or high grade sulfuric acid (reaction sequence (5)) by procedures well known in the art.

Reaction sequences (4) and (5) can be illustrated as follows:

(4) 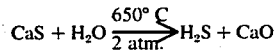

(5) 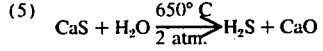

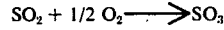

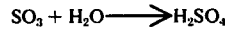

While the discussion herein has centered on the major products produced in the process of the present invention, it is to be understood that the effluent gases will contain excess carbon monoxide and hydrogen, as well as some residual hydrogen sulfide and carbon oxysulfide (see TABLE 1), all of which should be oxidized prior to discharge. The oxidation of carbon oxysulfide and hydrogen sulfide will produce sulfur dioxide, but as long as they are present at levels less than 100 parts per million, the sulfur dioxide produced should be at a level compatible with emission standards. The oxidation of these gases may be simply and easily carried out by using iron (III) oxide as a catalyst. And the high sulfur dioxide removal efficiency of the initial reaction sequence should allow discharge of the sulfur dioxide produced by the final catalytic oxidation step without any undesirable effects.

The fixed bed reactor 5 employed in the procedural Examples herein is primarily for laboratory demonstration purposes. Commercial pollution abatement equipment is usually designed with a view to the economics of the process and characteristically are designed to provide a large surface area for increased contact with the gaseous stream. It is therefore contemplated that the present process can be carried out in a variety of reactors, including, for example, a moving bed reactor, or plural fixed bed reactors each of which is alternately on process and regeneration cycles.

A moving bed reactor or plural fixed bed reactor would greatly facilitate continuous operation, although the present process is suited to either batch or continuous operation. And it is to be understood that in a commercial setting continuous operation is preferred so as to avoid the necessity of intermittent plant shutdown in order to replace the spent solid reagent.

The reactor can be constructed from any suitably inert material which is capable of withstanding the temperatures and conditions utilized in the process of the present invention. Material with a demonstrated capacity to meet the minimum specifications include, for example, quartz and titanium.

The reactions of the process of the present invention are temperature dependent, with the temperature necessary to make the present process efficient being at least about 650° C. Preferred temperatures, however, are between about 700° C and about 1000° C, especially between about 750° C and about 950° C.

When stack gases are mixed with carbon monoxide, hydrogen, or mixtures thereof at low temperatures (less than about 650° C) in the presence of calcium oxide, for example, the principal reaction which occurs is the formation of calcium sulfite via the dry limestone process for removal of sulfur dioxide from gases containing the same. The reaction can be illustrated by reaction (6).

$$CaO + SO_2 \rightarrow CaSO_3 \qquad (6)$$

The net effect of sulfite formation, as shown in TABLE 2, is to remove approximately 40 percent of the sulfur dioxide at temperatures in excess of 250° C but less than the preferred temperature in excess of about 700° C and sufficient to remove in general greater than 80 percent of the sulfur dioxide and nitrogen oxides present for the present process. In addition, nitrogen oxides are not removed at all, and 40 percent removal of the sulfur dioxide is grossly inadequate to prevent substantial air pollution. In contrast to the dry limestone process the present process removes in general greater than 80 percent of both sulfur dioxide and nitrogen oxides from gases containing the same without encountering any of the usual difficulties of product disposal associated with processes of the prior art.

(TABLE 1) that when calcium oxide, for example, is used as the solid reagent the products at higher temperatures are almost exclusively calcium sulfide from sulfur dioxide and nitrogen gas from nitrogen oxides.

The efficiency of the present process is also dependent upon the space velocity of the stack gases. And while any space velocity can be utilized in the present process, the inverse relations which exist between space velocity and reactor volume requires a commensurate increase in reactor volume when lower space velocities (longer contact time) are utilized. Therefore, space velocities of at least 15,000 reciprocal hours are preferred. Such space velocities permit the reactor volume to be reduced to a reasonable level, with a corresponding reduction in capital expenditures.

The required reducing agent which comprises carbon monoxide, hydrogen, or mixtures thereof may be supplied as such from an external source or it may be generated by the steam reforming of natural gas or other feeds comprising hydrocarbons to produce hydrogen and carbon oxides, or by the gasification of suitable solid carbonaceous material, such as, for example, coal of various grades, coke of various grades, and any combination thereof with carbon dioxide to provide carbon monoxide or with steam to provide gas comprising hydrogen and carbon oxides.

The process of the present invention contemplates the presence of other gases, such as, for example, carbon dioxide, water vapor, and oxygen, as well as solid contaminants, such as, for example, fly ash in the stack gases. These contaminants have little, if any, effect on the effectiveness and efficiency of the removal of sulfur dioxide and nitrogen oxides from such gases. For example, carbon dioxide can be present in amounts ranging from 0 percent to about 15 percent with little measurable effect. Similarly, the overall effect of water vapor on the process is negligible. In the range from 0 percent to about 15 percent water vapor does slightly improve

TABLE 2
PERCENTAGE SULFUR DIOXIDE (SO$_2$) AND NITROGEN OXIDES (NO$_{(x)}$) REMOVAL VS. TEMPERATURE OVER VARIOUS SOLID REAGENTS

| Calcium Oxide, CaO$^a$ | | Magnesium Oxide, MgO$^b$ | | Calcined Dolomite, CaO/MgO (58%/39%)$^a$ | |
|---|---|---|---|---|---|
| Temp. (° C) | %SO$_2$ Removed | %NO$_{(x)}$ Removed | Temp. (° C) | %SO$_2$ Removed | %NO$_{(x)}$ Removed | Temp. (° C) | %SO$_2$ Removed | %NO$_{(x)}$ Removed |

| Temp. (° C) | %SO$_2$ Removed | %NO$_{(x)}$ Removed | Temp. (° C) | %SO$_2$ Removed | %NO$_{(x)}$ Removed | Temp. (° C) | %SO$_2$ Removed | %NO$_{(x)}$ Removed |
|---|---|---|---|---|---|---|---|---|
| 205 | 11.9 | — | 220 | 45.8 | 10.7 | 840 | 73.2 | 70.7 |
| 280 | 38.1 | — | 320 | 1.0 | 4.2 | 885 | 93.7 | 92.8 |
| 355 | 39.9 | — | 500 | 21.7 | 19.0 | 895 | 94.4 | 94.8 |
| 465 | 40.3 | — | 665 | 35.3 | 25.7 | 905 | 93.6 | 93.8 |
| 555 | 29.3 | — | 780 | 29.0 | 51.1 | | | |
| 665 | 33.2 | 16.8 | 875 | 90.1 | 84.3 | | | |
| 720 | 59.9 | 25.1 | 955 | 93.6 | 85.8 | | | |
| 775 | 61.5 | 70.6 | 970 | 92.1 | 81.5 | | | |
| 820 | 91.4 | 91.7 | 975 | 92.1 | 78.0 | | | |
| 885 | 88.8 | 83.6 | | | | | | |

$^a$Feed gas composition: 7.2% CO$_2$; 7.2% H$_2$O; 2.1% O$_2$, 5.6% reducing agent (75% CO − 25% H$_2$ mixture in all cases); 1120 ppm NO$_{(x)}$; 1120 ppm SO$_2$; balance of gas is N$_2$.
$^b$Feed gas composition as a) except 1160 ppm NO$_{(x)}$.

The inadequacy of the removal of sulfur dioxide and nitrogen oxides from stack gases at temperatures much below the preferred temperatures of the present process is quite clear when it is considered that a 1000 megawatt power plant produces effluent at the rate of about 2 × 10$^6$ cubic feet per minute, and that in most stack gases the concentration of sulfur dioxide is usually between about 0.05 and about 0.3 percent by volume. In contrast, both sulfur dioxide and nitrogen oxides are almost completely removed at the preferred temperatures. Moreover, product analysis shows the removal efficiencies of sulfur dioxide over calcium oxide, but at the same time the removal of nitrogen oxides is slightly inhibited.

The effect of oxygen on the reaction chemistry is also negligible as long as sufficient reducing agent is present to reduce all the oxygen contained in the stack gases. It is clear, therefore, that when the reducing gas is generated from the fuel source, extra fuel must be consumed to remove the excess oxygen.

Solid contaminants have little effect on the reactor performance. As a result, it is contemplated that it may be possible to eliminate the fly ash removal system from stacks or to relocate it to a point following the reactor system of the present process. At the very least, particulate problems should be substantially reduced in the present process.

The following examples illustrate the present invention and the manner by which it can be practiced.

EXAMPLE 1 — Calcium Oxide Procedure

Calcium oxide solid reagent (9.0 grams, 0.16 mole) was placed in the illustrative fixed bed reactor described hereinbefore and held in place with quartz wool plugs. A gaseous mixture comprising 7.2 percent carbon dioxide, 7.2 percent water, 2.1 percent oxygen, 5.6 percent reducing gas (75 percent carbon monoxide and 25 percent hydrogen), 1120 parts per million nitrogen oxides, 1120 parts per million sulfur dioxide, and the remainder as nitrogen was passed into the reactor at a space velocity of 16,800 reciprocal hours. The temperature was maintained at 820° C throughout the reaction—a total period of 32.8 hours. Analysis of the effluent stream (exit gas) via an on line mass spectrometer indicated an average removal of 91.4 and 91.7 percent, respectively, of sulfur dioxide and nitrogen oxides from the feed gas stream. The effluent product concentration in parts per million were as follows: nitrogen, 510 (calculated from the amount of nitrogen oxides disappearance in the effluent); hydrogen sulfide, from 0 to 30; and carbon oxysulfide, 24. The distribution of sulfur species in the final solids as a percentage was as follows: sulfide, 84; sulfite, 16; sulfate, 0; and elemental sulfur, 0.

EXAMPLE 2 — Magnesium Oxide Procedure

The procedure described in EXAMPLE 1 above was employed, except that 6.4 grams (0.16 mole) of magnesium oxide was employed as the solid reagent, the feed gas contained 1160 parts per million nitrogen oxides, and the temperature was maintained at 970° C throughout the reaction. The effluent stream analysis indicated removal of sulfur dioxide and nitrogen oxides from the feed gas stream in the amount of 92.1 percent and 81.5 percent, respectively. The effluent stream product concentration in parts per million were as follows: nitrogen, 470 (calculated from the amount of nitrogen oxides disappearance in the effluent); hydrogen sulfide, 100 to 150; and carbon oxysulfide, 18. The major sulfur species constituent among the final solids was sulfide. Other possible constituents, such as sulfite, sulfate, and elemental sulfur were either very minor or undetectable.

EXAMPLE 3 — Calcined Dolomite Procedure

Following EXAMPLE 1 above, 8.9 grams (0.18 mole) of calcined dolomite (58 percent calcium oxide and 39 percent magnesium oxide) was placed in the reactor and the temperature was maintained at 895° C. Analysis of the effluent stream indicated 94.4 percent and 94.8 percent removal of sulfur dioxide and nitrogen oxides, resectively, from the feed gas stream. The effluent product concentration was as follows: nitrogen, 530 parts per million, (calculated from the amount of nitrogen oxides disappearance in the effluent); hydrogen sulfide, from 58 to 140 parts per million; and carbon oxysulfide, 18 parts per million. The major sulfur species constituent among the final solids was sulfide. Other possible constituents, such as sulfite, sulfate, and elemental sulfur were either very minor or undetectable.

Thus it is apparent that there has been provided, in accordance with the present invention, a process that fully satisfies the objects and advantages set forth hereinabove. While the invention has been described with respect to various specific examples and embodiments thereof, it is to be understood that the invention is not limited thereto and that many alternatives, modifications, and variations will be apparent to those skilled in the art in light of the foregoing description. Accordingly, it is intended to embrace all such alternatives, modifications, and variations as fall within the spirit and broad scope of the invention.

What is claimed is:

1. A process for removing sulfur dioxide and nitrogen oxides from stack gases containing the same which process comprises contacting such gases at a convenient space velocity and at temperatures in excess of about 700° C with a solid reagent consisting essentially of calcium oxide, magnesium oxide or compounds convertible thereto under the reaction conditions, or mixtures thereof in the presence of an excess of reducing gas comprising carbon monoxide, hydrogen, or mixtures thereof, with the solid reagent, by replenishing as necessary, being maintained in sufficient stoichiometric excess of the sulfur dioxide and other oxidants in the gases being treated to induce the formation of the corresponding sulfide of the alkaline earth metal component of the solid reagent.

2. The process of claim 1 wherein the solid reagent is regenerated from the corresponding sulfide of the alkaline earth metal ion of said solid reagent and recycled for continued removal of sulfur dioxide and nitrogen oxides from stack gases containing the same.

3. The process of claim 2 wherein the solid reagent is regenerated by contacting the corresponding sulfide of the alkaline earth metal component of said solid reagent with sufficient quantities of steam at temperatures of at least about 650° C and at pressures of at least about 2 atmospheres.

4. The process of claim 1 wherein the sulfur dioxide and nitrogen oxides are individually present in the stack gases being treated at low concentrations.

5. The process of claim 4 wherein the individual concentration of sulfur dioxide and nitrogen oxides in the stack gases being treated is no more than about 0.05 percent.

6. The process of claim 1 wherein the reducing gas is a mixture comprising carbon monoxide and hydrogen.

7. The process of claim 1 wherein the reducing gas mixture comprises between about 65 percent and 85 percent carbon monoxide and between about 15 percent and 35 percent hydrogen.

8. The process of claim 1 wherein the solid reagent is calcium oxide and the temperature is at least about 800° C.

9. The process of claim 1 wherein the solid reagent is magnesium oxide and the temperature is at least about 875° C.

10. The process of claim 1 wherein the solid reagent is calcined calcium magnesium carbonate (dolomite) and the temperature is at least about 885° C.

11. The process of claim 1 wherein the convenient space velocity is at least about 15,000 reciprocal hours.

* * * * *